(12) United States Patent
Gruchala et al.

(10) Patent No.: US 7,809,119 B2
(45) Date of Patent: Oct. 5, 2010

(54) METHOD AND SYSTEM FOR BLOCKING INCOMING CALLS TO MOBILE SUBSCRIBER DEVICES

(75) Inventors: Carol Shifrin Gruchala, Naperville, IL (US); Robert Wayne Heinmiller, Elgin, IL (US); Dianna Inara Tiliks, Palatine, IL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1196 days.

(21) Appl. No.: 11/149,071

(22) Filed: Jun. 9, 2005

(65) Prior Publication Data

US 2006/0281438 A1 Dec. 14, 2006

(51) Int. Cl.
*H04M 15/00* (2006.01)
*H04M 11/00* (2006.01)

(52) U.S. Cl. .............. 379/114.17; 379/114.15; 379/114.2; 455/406; 455/407

(58) Field of Classification Search ........... 379/114.01, 379/114.15–114.2, 207.02, 207.13, 210.02, 379/211.01; 455/405–408
See application file for complete search history.

(56) References Cited

U.S. PATENT DOCUMENTS

| | | | | |
|---|---|---|---|---|
| 5,825,863 A * | 10/1998 | Walker | ............... | 379/114.2 |
| 5,995,822 A * | 11/1999 | Smith et al. | ............... | 455/406 |
| 6,223,026 B1 * | 4/2001 | Martschitsch | ............... | 455/407 |
| 6,253,075 B1 * | 6/2001 | Beghtol et al. | ............... | 455/415 |
| 6,665,387 B2 * | 12/2003 | Hannu | ............... | 379/114.16 |
| 7,194,432 B1 * | 3/2007 | Ritter et al. | ............... | 705/34 |
| 2005/0013423 A1 * | 1/2005 | Eversen et al. | ............... | 379/114.17 |

* cited by examiner

*Primary Examiner*—Quoc D Tran
(74) *Attorney, Agent, or Firm*—Toler Law Group

(57) ABSTRACT

A method includes setting an account value of an account to a first amount, wherein the first amount is associated with a specified level of authorized usage of a phone associated with the account. The method further includes blocking an incoming call intended for the phone when the account value is at a second amount that is at or lower than a predetermined threshold amount, wherein the second amount is associated with available usage of the phone. A data processing system includes a triggering module to generate a trigger signal when an account value of an account is at or lower than a predetermined reserve amount, greater than zero wherein the account value is associated with authorized usage of a phone associated with the account and a blocking module to block an incoming call to the phone in response to the trigger signal.

35 Claims, 5 Drawing Sheets

METHOD AND SYSTEM FOR BLOCKING INCOMING CALLS TO MOBILE SUBSCRIBER DEVICES

BACKGROUND

1. Field of the Disclosure

The present disclosure relates generally to phone systems.

2. Description of the Related Art

Users of mobile subscriber devices, such as cellular phones, typically obtain an account with a phone service provider whereby the user is provided authorized usage of the phone service provider's resources on the basis of an account value of the user's account. The account value typically indicates authorized usage on the basis of time left (e.g., remaining minutes) or as a remaining monetary balance. When the user's account value indicates that no authorized usage remains, the phone service provider typically prohibits any further authorized use of its resources until the account value is increased. An increase in the account value may occur in response to a payment made by the user or the occurrence of a period event, such as refreshing the account value at the end of each billing cycle.

DETAILED DESCRIPTION OF THE DRAWINGS

Figure 1:
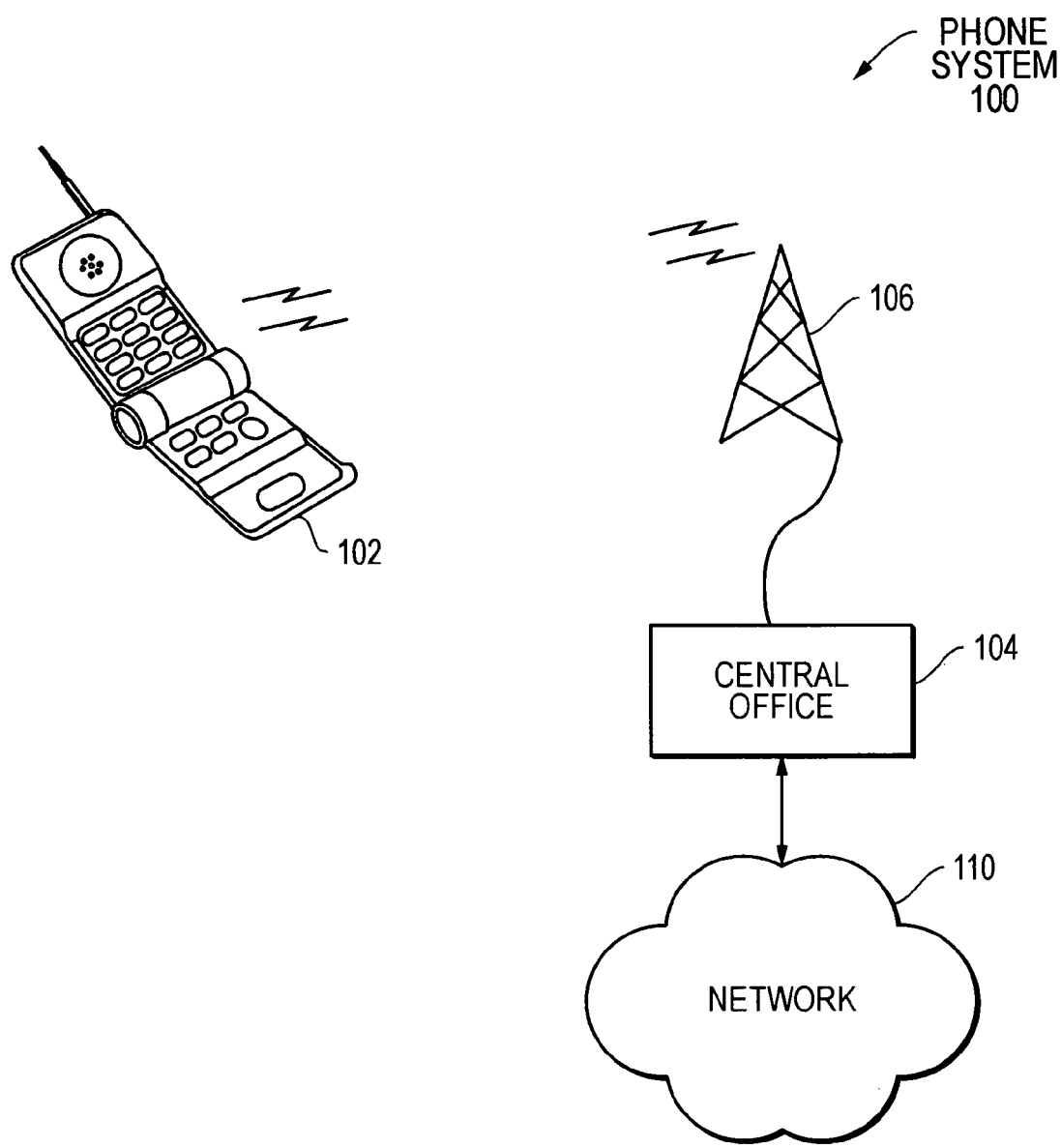
FIG. 1 is a block diagram illustrates an exemplary phone system in accordance with at least one embodiment of the present disclosure.

Referring to FIG. 1, an illustrative phone system 100 is shown. The phone system 100 includes a central office 104 coupled to an antenna 106 and to a distributed network 110. The antenna 106 is within wireless communication range of mobile subscriber devices, such as the illustrated cellular phone 102.

Figure 2:
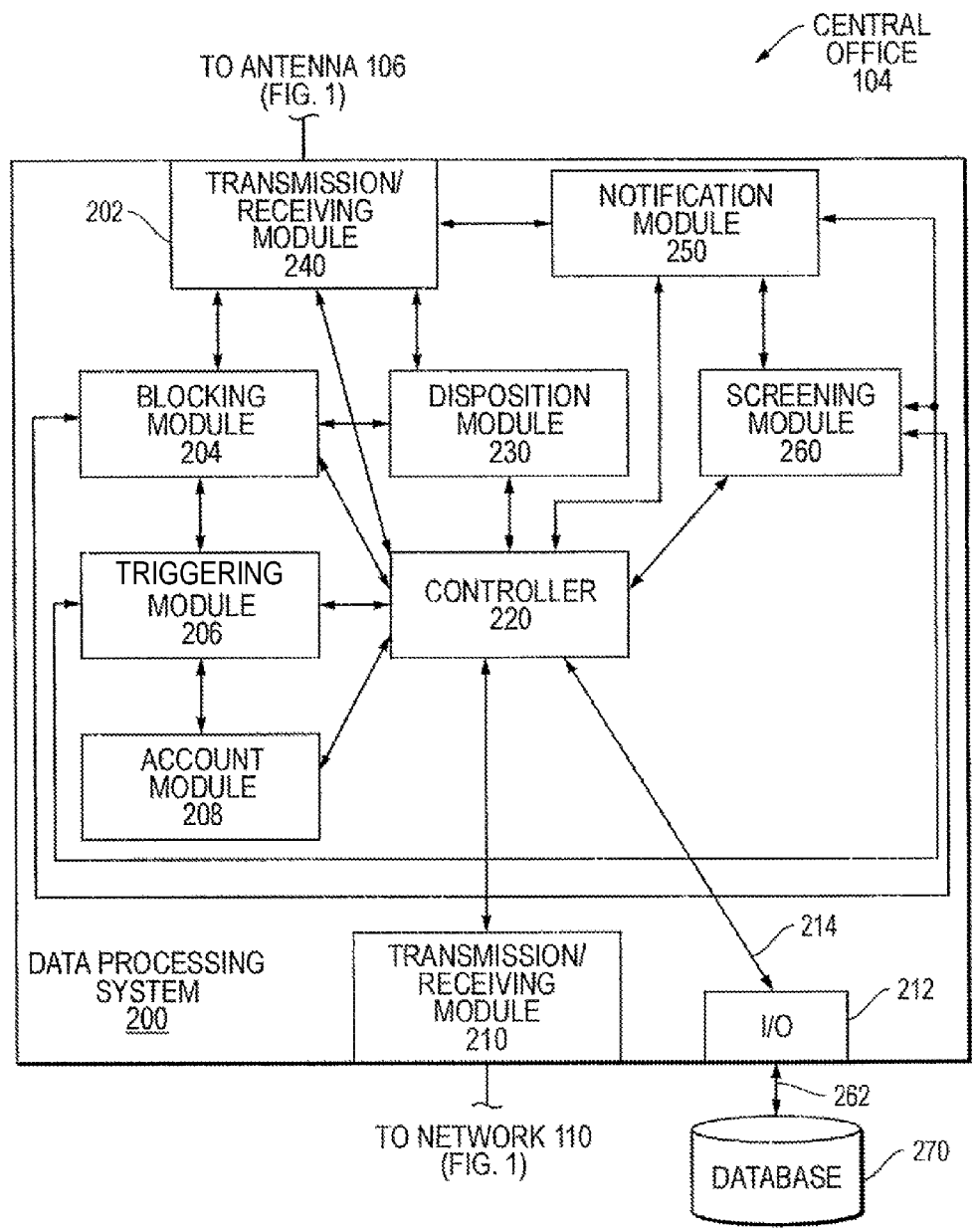
FIG. 2 is a block diagram illustrates an exemplary data processing system in accordance with at least one embodiment of the present disclosure.

Referring to FIG. 2, a particular embodiment of a data processing system 200 utilized at the central office 104 is shown. The data processing system 200 is coupled to an external database 270 via a communication link 262. The data processing system is coupled to the database 270 via an input/output port 212. The data processing system 200 is in communication with the antenna 106 via a transmission/receiving module 240. The data processing system 200 is in communication with a network such as the network, 110 (FIG. 1), via a transmission/receiving module 210. The data processing system 200 includes a controller 220, a blocking module 204, a triggering module 206, an account module 208, a disposition module 230, a screening module 260, and a notification module 250. The controller 220 is coupled to the disposition module 230, the blocking module 204, and the triggering module 206 in order to handle treatment of an incoming call that is to be routed to a phone, such as the illustrated portable phone device 102 (FIG. 1).

The triggering module 206 is responsive to the account module 208 that can determine an account and an account value of authorized usage for each mobile user. Data for making such a determination may be obtained from database 270, in one embodiment. When the account for a particular user within the account module 208 has an account value that is at or lower than a predetermined threshold amount, then the triggering module 206 sends a message to the blocking module 204. In one embodiment, the predetermined amount may be a balance (e.g., a positive number), and in another embodiment, the predetermined amount can be a difference between an account's credit limit and the balance (e.g., a negative number, in that the user already may owe the service provider money for past service). The blocking module 204, in response to control by the controller 220 sends an activation message to the disposition module 230. The disposition module 230 may provide a communication via transmission/receiving module 240 and via antenna 106 to the remote subscriber unit, such as the cellular phone 102. In addition, the controller 220 may provide a message to be forwarded to a user of the cellular phone 102 via the notification module 250.

Thus, when a call is received from the network 110 at the transmission/receiving module 210 and that call is to be routed via transmission module 240 to a remote communication device, such as the cellular phone 102, the controller 220 and associated within the various modules within the data processing system 200 may intercept the call and may selectively block the call based on an account value as determined from data within the account module 208. In a particular embodiment, the incoming call is screened by screening module 260 in cooperation of the controller 220 to determine whether the incoming call is to be blocked.

More specifically, in a particular illustrative embodiment, the triggering module 206 makes a comparison between a second amount value that is associated with remaining usage on the phone 102 and a predetermined threshold value. When the account value is at or lower than the predetermined threshold amount, then the data processing system 200 can selectively block the call from being forwarded to the phone 102. In a particular embodiment, the predetermined threshold value is a non-zero threshold value.

While incoming calls received at the data processing system 200 of the central office 104 can be selectively blocked and not forwarded to the phone 102, it should be understood that when there is a non-zero amount of available usage in the account of the user, a user of the phone device 102 may place outgoing calls to either other wireless communication devices, such as other cell phones, or to remote destination communication devices such as landline phones that are accessible over the network 110. In addition, the account value for multiple users may be stored within the database 270 as shown in FIG. 2. Thus, a plurality of account values that are identified with usage of various mobile device subscribers are stored in the database 270 and actively monitored by the data processing system 200. The account value information is used for selective call blocking when an account value of a particular subscriber is at or lower than a predetermined threshold amount.

Figure 3:
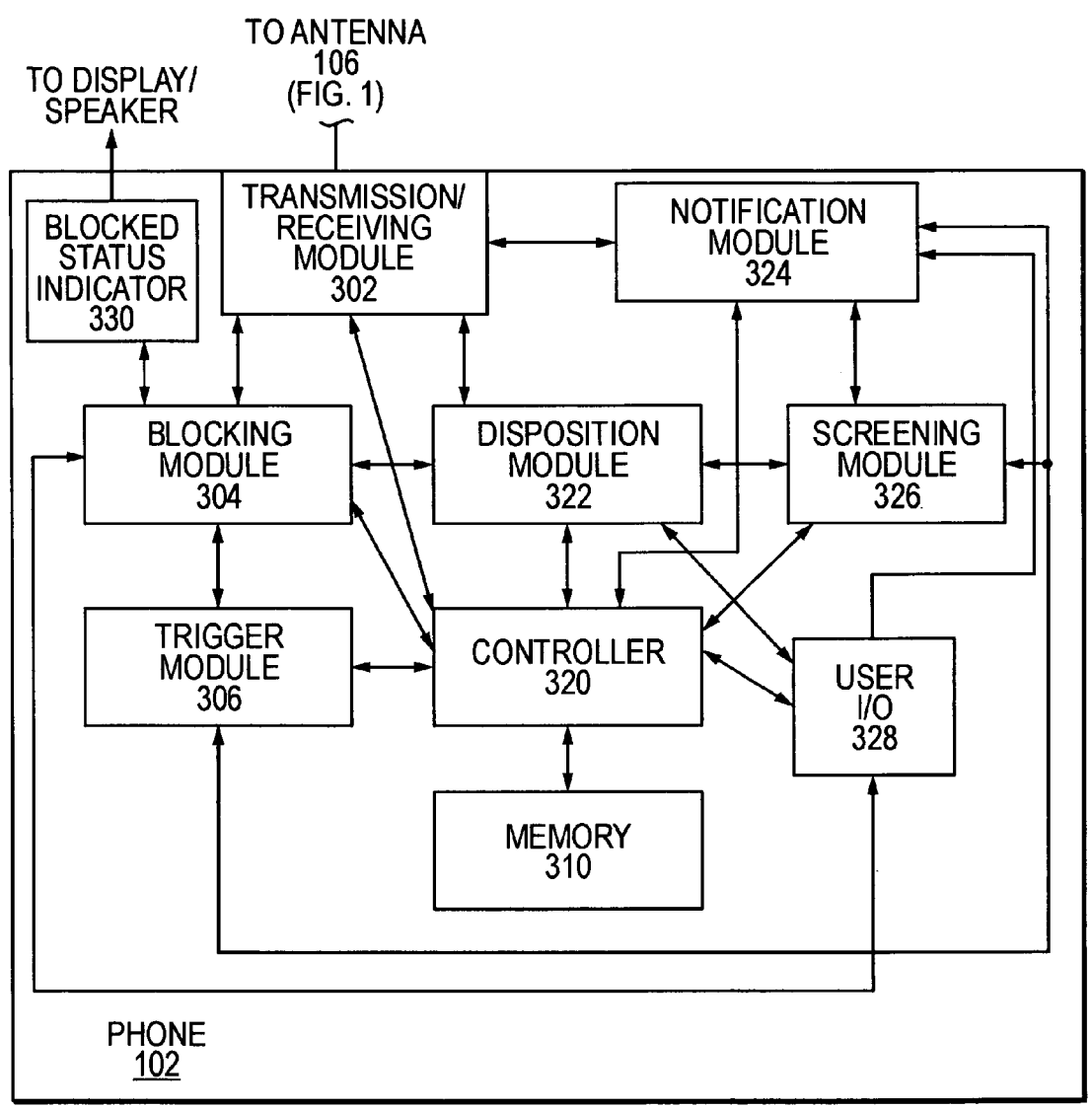
FIG. 3 is a block diagram illustrates an exemplary phone device in accordance with at least one embodiment of the present disclosure.

Referring to FIG. 3, an illustrative embodiment of various components of the phone 102 is shown. The phone 102 is in wireless communication with a remote antenna such as the illustrated antenna 106. The phone 102 includes a transmission/receiving module 302, a blocking module 304, a trigger module 306, a disposition module 322, computer readable memory 310, a screening module 326, a notification module 324 and a blocked status indicator module 330. The phone 102 also includes a controller 320 that can be implemented as a microprocessor device. The phone device 102 also can include a user input/output interface 328 such as, for example, a display, a keypad, a keyboard, a mouse, an electronic pointer device, a speaker, a microphone, a combination thereof or other suitable user interface devices. In a particular embodiment, the phone 102 can be a cellular phone that includes memory and a microprocessor coupled to the memory that performs one or a combination of functions described herein with respect to the various components shown in FIG. 3.

In a particular embodiment, the phone charge all 102 is implemented to have access to an account value of a particular subscriber account that is associated with a specified level of authorized usage of the phone device 102 by the subscriber. Such account information may be available at the phone 102 (e.g., memory 310) or from the database 270 via the data processing system 200. For example, the account can identify an available number of minutes of phone usage that are available for use by the phone 102. In another embodiment, the account value may be a monetary amount, such as a dollar amount of available funds that may be used to purchase usage of the phone, e.g., a particular number of minutes of usage. When the account value changes to a second amount that is at or lower than a predetermined threshold value, the trigger module 306 can provide notification to the notification module 324 that a low account condition has been reached. In addition, the blocking module 304, in response to controller 320 that is coupled to the notification module 324, can selectively block calls that are received at the phone device 102. Thus, the blocking module 304 may selectively block calls received at the transmission/receiving module 302 as such calls are received via antenna 106.

The account value associated with available phone usage may be stored and retrieved from the memory 310 by the controller 320. In addition, the blocked status indicator module 330 can provide a user-detectable indicator of the account value for display or output. The user-detectable indicator can include, for example, an icon or other visual indicator displayed by a display device of the phone 102. The user-detectable indicator also may include a change in a characteristic, such as color, of at least a portion of a displayed image at the display device. Alternatively, the user-detectable indicator can include an audible indicator output by a speaker of the phone 102. An exemplary display of the phone 102 having visual indicators of the call block status of the phone 102 is illustrated with respect to FIG. 5.

The phone 102 can be configured to the preferences or desires of the user. In a particular embodiment, the user has the capability of optionally setting the call screening options via an interactive voice response system or web access interface to allow or block calls when they reach the predetermined account usage associated with their customer plan. In another option, the user may receive a special tone to indicate they are making a call when they are over the minute usage allocated to their plan. After reading this specification, skilled artisans will appreciate that other user configuration options are possible and can be designed into the phone 102 or made available to the user via the data processing system 200.

As incoming calls are blocked when the account value is at or lower than the predetermined threshold amount, the predetermined threshold can be used to indicate an available usage for a reserve level or for emergency outgoing use. For example, even though incoming calls may be blocked when the account value is at or lower than the predetermined threshold amount, outgoing calls may be placed by the user of the phone 102. Thus, the predetermined threshold amount is used to identify a reserve level of telephone usage that may be used for emergency calls or other needed outgoing calls so that the user of the phone 102 can indicate communications with others as needed.

After the account value is at or lower than the predetermined threshold, a user may replenish the account, such as by paying for additional minutes or otherwise, having the account refreshed from a communication service provider. In this case, the account value may be changed from a second amount value that is at or below the predetermined threshold to a third amount that is greater than the threshold. Thus, a user at phone 102 or service provider operating the data processing system 200 may replenish the user's account, add needed minutes or funding to the account, and then be able receive incoming calls consistent with conventional phone device usage.

In a particular embodiment, incoming calls may be blocked, and the determination of call blocking may be made at the central office 104 (FIG. 1) by the data processing system 200 (FIG. 2). In this embodiment, the data processing system 200 forwards a signal from the transmission module 240 (FIG. 2) via antenna 106 (FIG. 1) to the phone 102 to provide notification of the blocking condition. In this embodiment, the disposition module 322 receives and recognizes the disposition signal and, in response, selectively blocks incoming calls. In another embodiment, the phone 102 can determine whether call blocking is activated by monitoring the account value and triggering events to detect the low account condition as described above. In a particular embodiment, the screening module 326 may perform call screening to determine whether a low account condition has been met and generate a disposition signal based on the screening process. The disposition signal can include information regarding whether the incoming call is to be blocked.

Also, in a particular embodiment, the screening module 326 may be used by a user of the phone 102 to screen incoming calls. The screening module 326 can generate and transmit a disposition signal to the blocking module 304. The screening module 326 also may be turned off selectively by a user override feature where the user of the phone 102 may override the automatic screening function and allow additional incoming calls even after the account value is at or lower than the predetermined threshold amount. Thus, in this embodiment, the disposition module 322 can generate and transmit a disposition signal to the blocking module 304 in response to a user input signal where the disposition signal indicates whether the incoming call is to be blocked by the blocking module 304 per user instruction.

Figure 4:
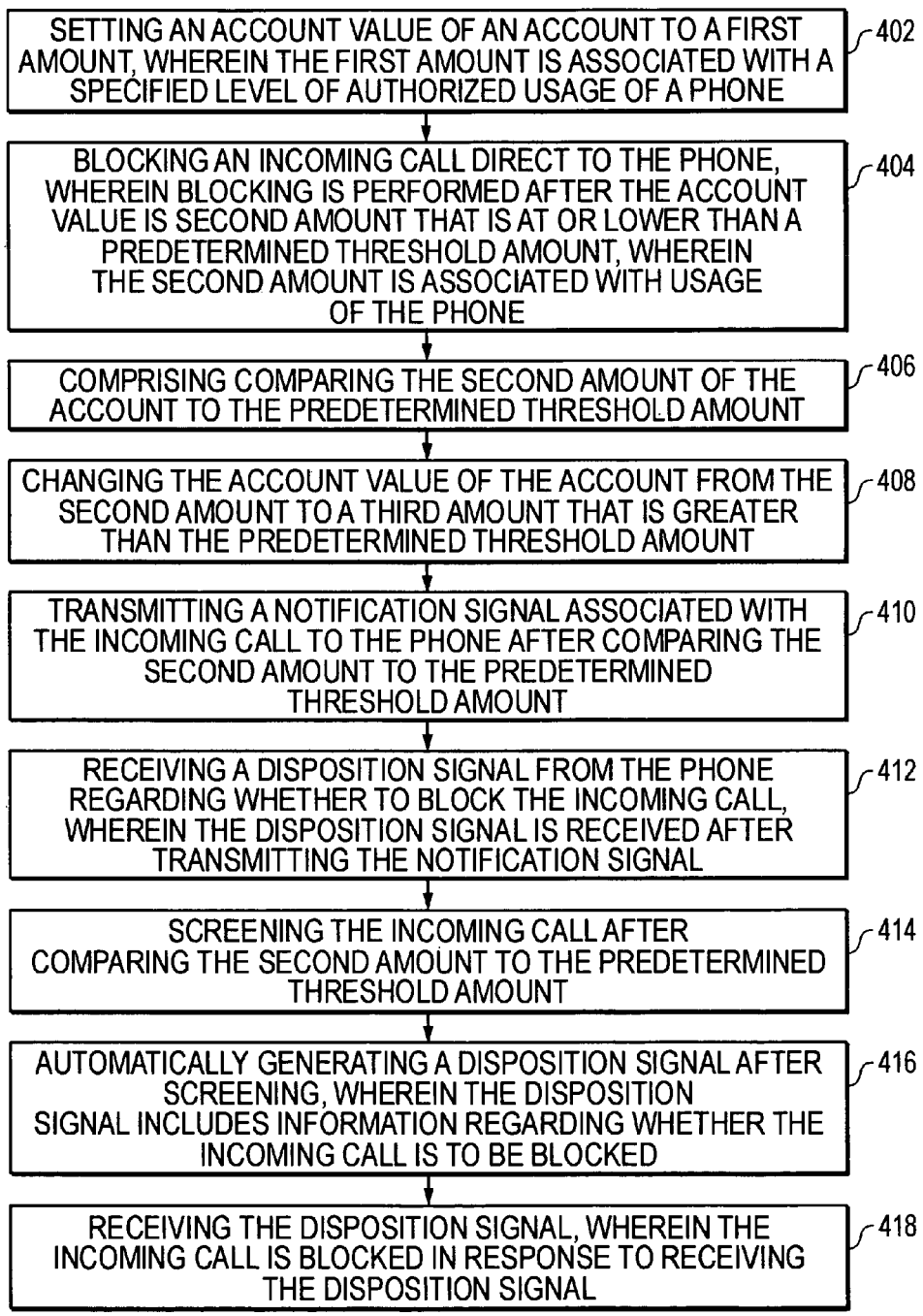
FIG. 4 is a flow diagram illustrates an exemplary method of using a phone system in accordance with at least one embodiment of the present disclosure.

Referring to FIG. 4, a method of using a phone system is shown. The method includes setting an account value of an account to a first amount, where the first amount is associated with a specified level of authorized usage of a phone device, at 402. The method further includes blocking an incoming call directed to the phone device, wherein the blocking is performed after the account value is at a second amount that is at or below a predetermined threshold value, at 404. The second amount is associated with a second level of usage of the phone device. The second amount may be an updated account value after the phone has been used a particular number of minutes or where a particular amount of funded and authorized use has been consumed. The method further includes comparing the second amount of the account to the predetermined threshold amount, at 406.

The method further includes an option of changing the account value of the account from the second amount to a third amount that is greater than the predetermined threshold, at 408. The charge in the amount may be in response to a user request or payment to a communication service provider to update the user's account. An example of such a changed account is where a service provider resets the amount for the user's account value at the beginning of the month or after making a payment to purchase a certain number of minutes.

The method further includes transmitting a notification signal associated with the incoming call to the phone device after comparing the second amount to the predetermined threshold amount, at 410, and receiving a disposition signal from the phone device regarding whether to block the incoming call, at 412. The disposition signal is received after the notification signal is transmitted. When the notification signal provided along with the incoming call indicates that the second amount is at or lower than the predetermined threshold amount, then the disposition signal initiates blocking of the incoming call due to the lack of authorized and available account usage. In a particular illustrative embodiment, the method optionally includes screening the incoming call after comparing the second amount to the predetermined non-zero threshold amount, at 414. The method also includes generating a disposition signal after screening the call where the disposition signal includes information regarding whether the incoming call is to be blocked, at 416. The incoming call is to be blocked in response to receiving the disposition signal. In one embodiment, the incoming call is blocked at the phone device, at 418.

Figure 5:
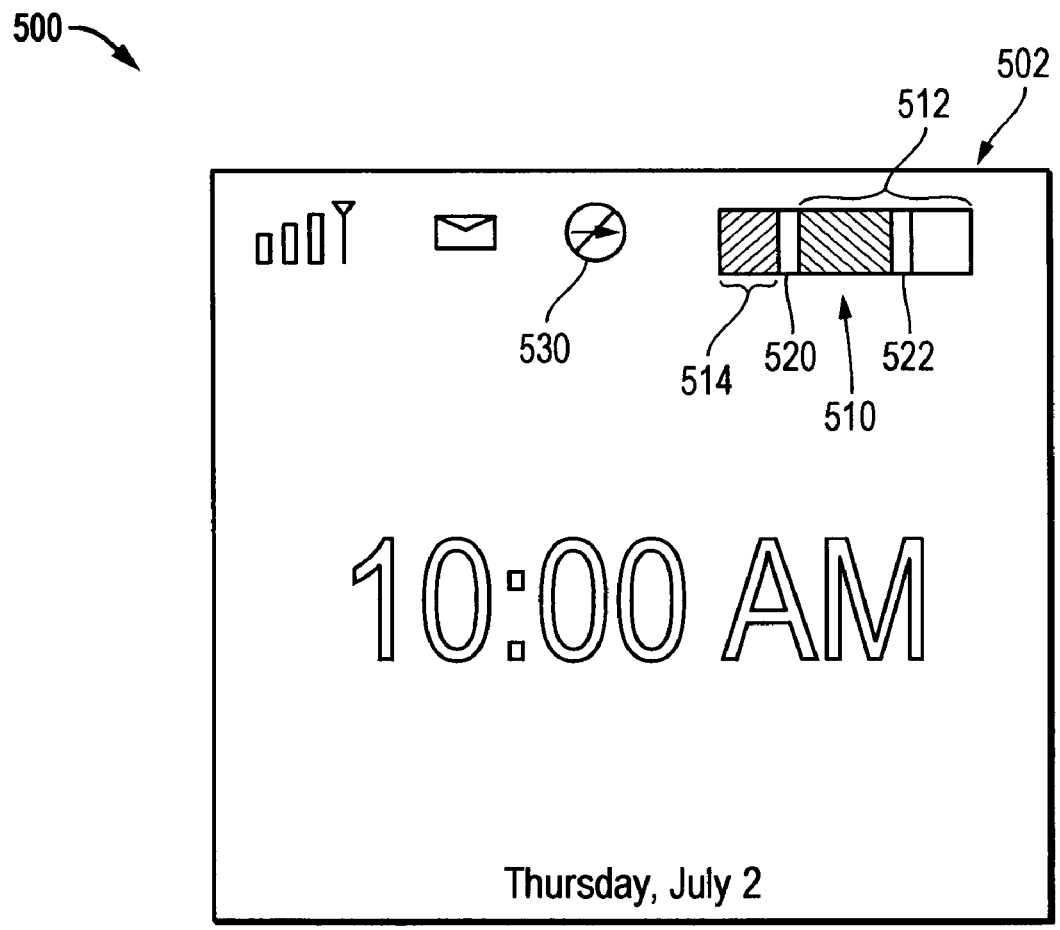
FIG. 5 is a block diagram illustrates an exemplary display of a phone system in accordance with at least one embodiment of the present disclosure.

Referring to FIG. 5, an exemplary display 502 of a phone device 500 is shown. The display 502 includes a display icon 510 that indicates authorized usage based on the account value of the subscriber of the phone device 500. The display icon 510 includes a first usage area 512 and a second usage area 514. The display icon 510 also includes a predetermined threshold indicator 520. The predetermined threshold indicator 520 provides a visual separation of the first usage area 512 from the second usage area 514. In a particular embodiment, the predetermined threshold indicator 520 corresponds to the predetermined threshold value that triggers selective incoming call blocking. When the account value is at or lower than the predetermined threshold amount, an account value level indicator 522 will be at or below the predetermined display indicator 520 that indicates that usage level is within the second display region 514.

When the account value (as represented by the indicator 520) is in the second usage 514, incoming phone calls to the phone device 500 are blocked while a small account reserve suitable for emergency usage is maintained and other needed usage that may be desired by the user of the phone device 500. For example, the predetermined identifier 520 indicates a reserve level or a low level of account usage remaining, such that the user can place outgoing calls and needed emergency calls but cannot receive any incoming calls. Thus, the user can be provided a warning function associated with a low account level and can have incoming calls blocked but the user is not immediately cut off from placing outgoing calls. For example, the predetermined threshold account value may be set to thirty minutes of remaining talk time.

In another embodiment, the display icon 510 may include an analog gauge-type icon (not illustrated), similar to a car fuel gauge, with a full account indicator at one end, an empty account indicator at the other end, a reserve indicator between the full account indicator and the empty account indicator, and a needle icon that sweeps between the full account indicator and the empty account indicator based on the status of the account value.

Various other characteristics of the display icon 510 or the display 502 may change based on the status of the account value. For example, when the account value falls below the predetermined threshold value, a color of at least a portion of the display icon 510 or the display 502 may change, thereby indicating that incoming calls are blocked. Similarly, an "incoming call blocked" icon 530 can be displayed or an audio tone may be output to indicate that incoming calls are blocked. Those skilled in the art can develop other audio and/or visual indicators of the account status with reference to the predetermined threshold value using the guidelines provided herein without departing from the scope of the present disclosure.

Note that not all of the activities described above in the general description or the examples are required, that a portion of a specific activity may not be required, and that one or more further activities may be performed in addition to those described. Still further, the order in which activities are listed are not necessarily the order in which they are performed. After reading this specification, skilled artisans will be capable of determining what activities can be used for their specific needs or desires.

Any one or more benefits, one or more other advantages, one or more solutions to one or more problems, or any combination thereof have been described above with regard to one or more particular embodiments. However, the benefit(s), advantage(s), solution(s) to problem(s), or any element(s) that may cause any benefit, advantage, or solution to occur or become more pronounced is not to be construed as a critical, required, or essential feature or element of any or all of the claims.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:

setting an account value of an account to a first amount, wherein the first amount is associated with a specified level of authorized usage of a phone associated with the account;

blocking an incoming call intended for the phone when the account value is at a second amount that is equal to or lower than a first predetermined threshold amount, wherein the first predetermined threshold amount is greater than zero, wherein the second amount is associated with available usage of the phone, and wherein an outgoing call is not blocked and is not restricted to one or more predetermined numbers; and blocking the outgoing call from the phone when the second amount is equal to or lower than a second predetermined threshold amount, wherein the second predetermined threshold amount is less than the first predetermined threshold amount.

2. The method of claim 1, further comprising comparing the second amount of the account to the predetermined threshold amount.

3. The method of claim 1, further comprising changing the account value to a third amount greater than the predetermined threshold amount.

4. The method of claim 1, further comprising:

providing a notification signal associated with the incoming call to the phone based on a comparison of the second amount to the first predetermined threshold amount; and receiving a disposition signal indicating whether to block the incoming call, wherein the disposition signal is received after transmitting the notification signal.

5. The method of claim 4, wherein the disposition signal is received from the phone.

6. The method of claim 1, further comprising screening the incoming call based on a comparison of the second amount to the first predetermined threshold amount.

7. The method of claim 6, further comprising generating a disposition signal after screening the incoming call, wherein the disposition signal indicates whether the incoming call is to be blocked.

8. The method of claim 7, further comprising receiving the disposition signal, wherein the incoming call is blocked in response to receiving the disposition signal.

9. The method of claim 1, wherein the account value represents an available monetary amount for phone usage.

10. The method of claim 1, wherein the account value represents an available time amount for phone usage.

11. The method of claim 10, wherein the available time amount is represented as minutes of phone usage available.

12. The method of claim 1, wherein the second predetermined threshold amount comprises a non-zero threshold amount.

13. The method of claim 1, wherein an outgoing call from the phone is not blocked when the incoming call is blocked and the account value is not less than the second predetermined threshold amount.

14. The method of claim 13, wherein the second predetermined threshold amount is associated with a cessation of authorized usage of the phone.

15. The method of claim 1, further providing a user detectable indicator at the phone, the user detectable indicator representative of an incoming call blocking status of the account.

16. The method of claim 15, wherein the user detectable indicator is at least one of a visual indicator displayed on a display of the phone or an audible indicator output by a speaker of the phone.

17. A data processing system comprising:
a triggering module to generate a first trigger signal when an account value of an account is at or lower than a first predetermined reserve amount and to generate a second trigger signal when the account value of the account is at or lower than a second predetermined reserve amount, wherein the first predetermined reserve amount and the second predetermined reserve amount are greater than zero, and wherein the account value is associated with authorized usage of a phone associated with the account; and
a blocking module, wherein the blocking module blocks an incoming call to the phone in response to the first trigger signal unless the incoming call is selectively accepted by a user of the phone and blocks an outgoing call from the phone in response to the second trigger signal.

18. The data processing system of claim 17, further comprising an account module to initialize or change the account value of the account.

19. The data processing system of claim 17, further comprising a notification module to generate a notification signal associated with the incoming call.

20. The data processing system of claim 19, further comprising a transmission module to transmit the notification signal to the phone.

21. The data processing system of claim 17, further comprising a screening module to screen the incoming call in response to the first triggering signal.

22. The data processing system of claim 21, wherein the screening module is further configured to generate a disposition signal that includes information derived from a user input signal to determine whether the incoming call is to be selectively accepted by the user of the phone.

23. The data processing system of claim 21, further comprising a disposition module to receive a disposition signal from the phone, wherein the disposition signal includes information regarding whether the incoming call is to be selectively accepted by the user of the phone.

24. The data processing system of claim 23, wherein the blocking module is further configured to block the incoming call in response to the disposition signal.

25. The data processing system of claim 17, wherein the blocking module is still further configured to permit outgoing calls from the phone when the incoming call is blocked and the account value is not less than the second predetermined reserve amount.

26. The data processing system of claim 17, wherein the account value represents at least one of an available monetary amount for phone usage or an available time amount for phone usage.

27. A phone comprising:
a receiving module to receive an incoming call signal associated with an incoming call;
a blocking module to selectively block the incoming call when an account value of an account is at or lower than a predetermined reserve amount but greater than zero, wherein the account value is associated with remaining usage of the phone;
an override module that, when activated by a user in response to the incoming call, overrides the blocking module and allows the incoming call when an account value of an account is at or lower than the predetermined reserve amount but greater than zero; and
a screening module configured to allow user screening of the incoming call regardless of a source of the incoming call and to provide a disposition signal to the blocking module, wherein the disposition signal indicates whether the incoming call is to be blocked.

28. The phone of claim 27, further comprising a triggering module to provide a trigger signal to the blocking module when the account value of the account is at or lower than the predetermined reserve amount.

29. The phone of claim 27, further comprising a notification module to generate a notification signal associated with receiving the incoming call.

30. The phone of claim 27, further comprising a disposition module to provide a disposition signal to the blocking module in response to a user input signal indicating whether the user selectively activates the override module, wherein the disposition signal indicates whether the incoming call is to be blocked.

31. The phone of claim 30, wherein the blocking module is further configured to block the incoming call in response to the disposition signal.

32. The phone of claim 27, further comprising a blocked status indicator module to provide a user detectable indicator representative of an incoming call block status of the account.

33. The phone of claim 32, wherein the user detectable indicator is at least one of a visual indicator displayed on a display of the phone or an audible indicator output by a speaker of the phone.

34. The phone of claim 27, wherein the blocking module is configured to block the incoming call in response to a signal provided via a central office.

35. The phone of claim 27, wherein the blocking module is configured to block the incoming call in response to user selection input.

* * * * *